Jan. 29, 1963    C. S. CHAPMAN ETAL    3,075,408
DRIVE AXLE TRANSMISSION
Filed Aug. 19, 1959    3 Sheets-Sheet 1
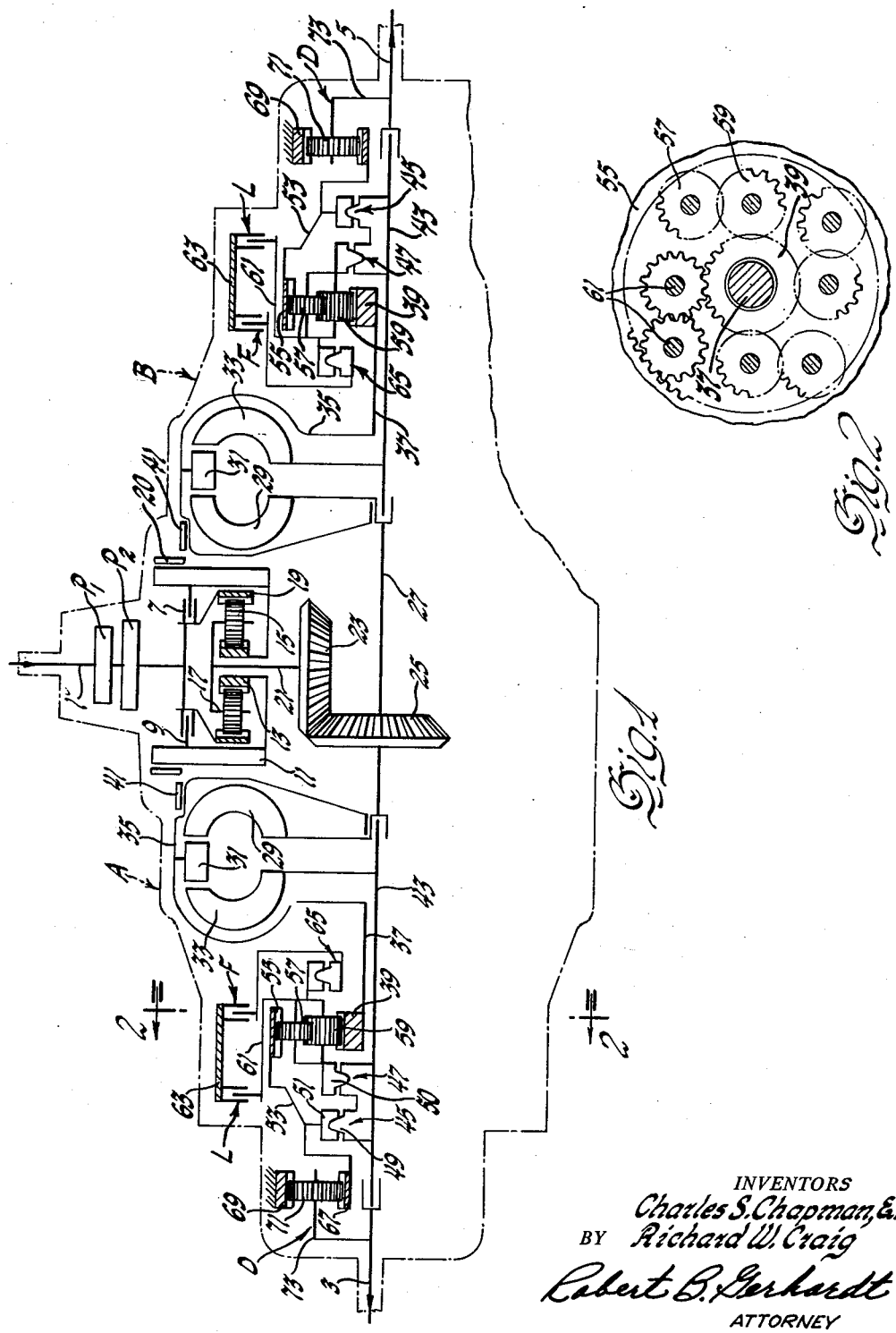
INVENTORS
Charles S. Chapman, &
BY Richard W. Craig
Robert B. Gerhardt
ATTORNEY

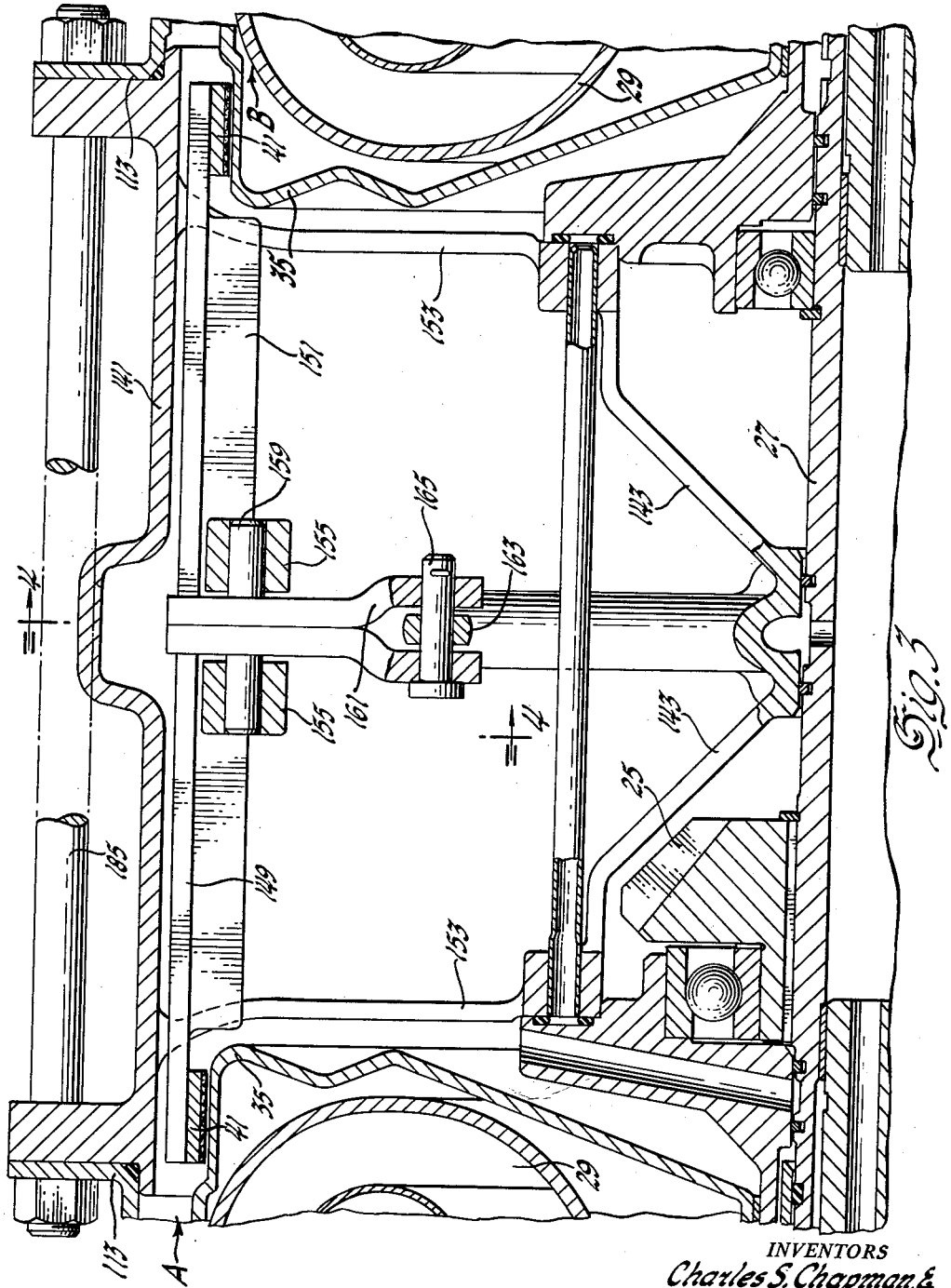

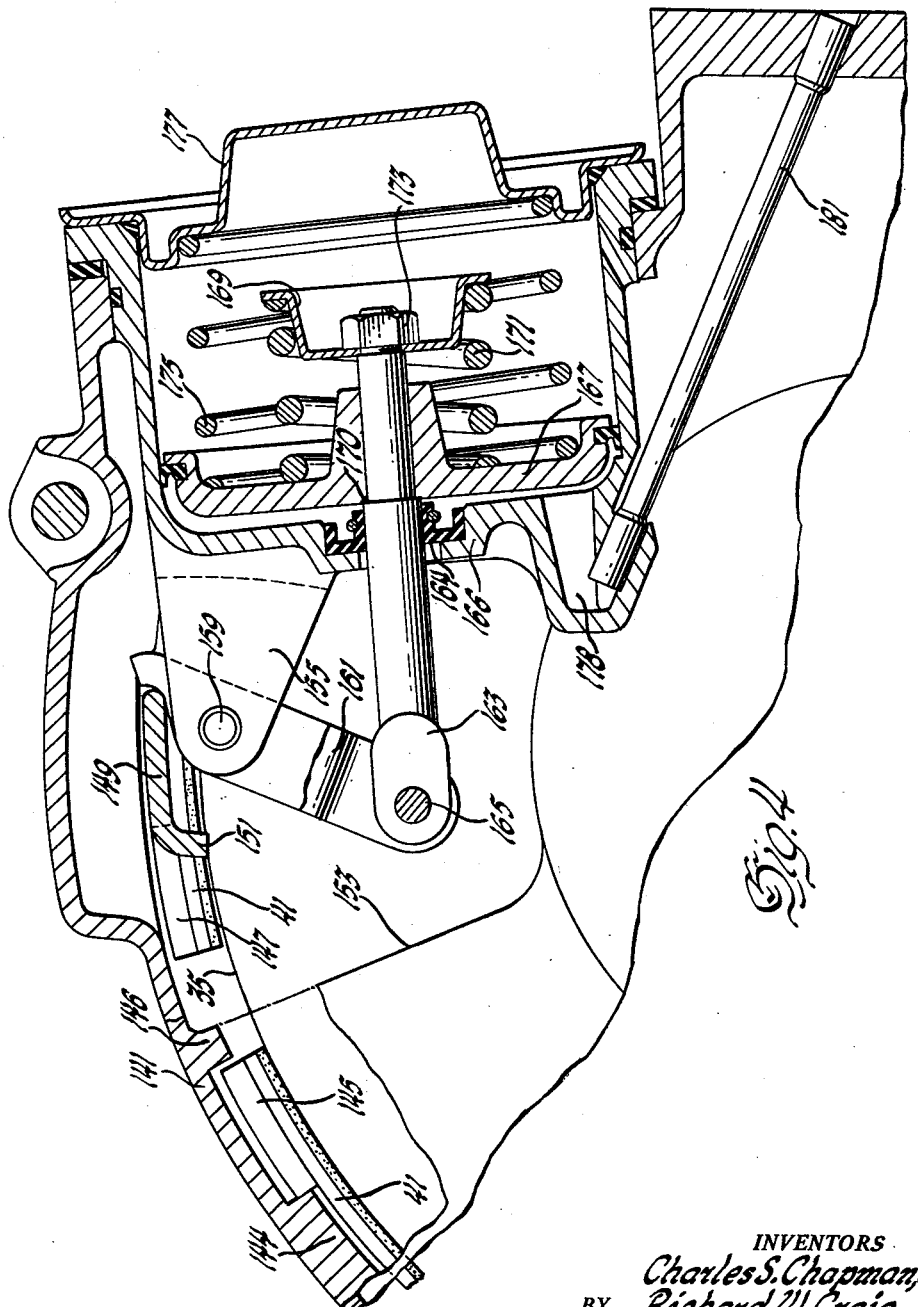

United States Patent Office 3,075,408
Patented Jan. 29, 1963

3,075,408
DRIVE AXLE TRANSMISSION
Charles S. Chapman, Grand Blanc, and Richard W. Craig, Flint, Mich., assignors to General Motors Corporation, Detroit, Mich., a corporation of Delaware
Filed Aug. 19, 1959, Ser. No. 834,695
4 Claims. (Cl. 74—677)

This invention relates to motor vehicle transmissions and more particularly to automatic transmissions suitable for independent drive to each drive axle of the vehicle.

There are certain advantages to be gained from independently driving the drive wheels of a motor vehicle from a rear mounted transmission unit. In particular where hydraulic torque transmitting elements are interposed in the drive train the conventional differential can be eliminated and the hump created by a front mounted transmission can be eliminated. Furthermore with independent drive to each wheel, a true non-slip drive can be obtained since the torque transmission to one wheel is not affected by slip of the other wheel, as is the case of a conventioinal differential.

One such independent drive arrangement is shown and described in S.N. 785,390 filed January 7, 1959 in the name of Oliver K. Kelley, Kenneth W. Gage and Richard W. Craig, and entitled Drive Axle Transmission. The arrangement shown therein employs a pair of transmissions, supported from a common pivot in turn pivoted on the vehicle. In the Kelley et al. application, it is necessary to utilize an independent rear wheel suspension. The present invention provides a single unit providing independent drive to each wheel and which can physically substitute for the conventional differential. By employing certain novel features the unit can be made compact and duplication of parts can be minimized.

It is therefore an object of the invention to provide a rear mounted transmission that in a single compact unit will provide independent automatic torque ratio changed drive to each drive wheel.

It is a further object of the invention to provide such a transmission having a fluid servo operating several different spaced friction elements.

These and other objects and features will be apparent to those skilled in the art from the following description and figures which show and describe a representative example of an application of the invention and in which:

FIGURE 1 is a schematic top view of the transmission unit showing the various drive units;

FIGURE 2 is a cross sectional view taken on the line 2—2 of FIGURE 1 and showing the relationship of certain gear elements;

FIGURE 3 is an enlarged sectional view of the center of the transmission unit as seen from the rear of the unit;

FIGURE 4 is a sectional view taken on the line 4—4 of FIGURE 3.

FIGURE 1 shows the arrangement of the elements as seen from the top, the front of the vehicle being toward the top of the figure. An input shaft 1 is suitably connected, as by a drive shaft, to be driven by the vehicle engine. A pump unit $P_1$ driven by shaft 1 is connected through means, not shown, to scavenge various areas in the transmission. Another pump $P_2$ is driven by the shaft 1 to supply fluid under pressure for various uses in the transmission.

The input shaft 1 carries drive clutch plates 7 which can be engaged by suitable means to driven clutch plates 9, the plates 9 being carried by an inertia drum 11 connected to a sun gear 13. A plurality of planet pinions 15 are rotatably mounted on a carrier 17 and mesh with the sun gear 13 and also with a ring gear 19 connected to the input shaft 1. A friction band 20 is provided to hold the drum 11 and sun gear 13 against rotation to provide reaction for the planetary gearing in known manner. With the band 20 holding the sun gear 13 from rotation, and the clutch 7—9 disengaged, the carrier 17 will be driven forward at a reduced speed. With the band 20 disengaged and clutch 7—9 engaged, the gear unit will be locked up for direct drive between input shaft 1 and carrier 17. With both clutch 7—9 and band 20 disengaged the transmission is in neutral.

The output carrier 17 is connected to drive an intermediate shaft 21 having a bevel gear 23 fixed thereon. The gear 23 meshes at right angles with a second bevel gear 25 fixed on a cross shaft 27. The shaft 27 extends from both sides of gear 25 into a left hand unit transmission axle A and a right hand transmission axle unit B. These units each form a combined torque converter and gear unit for transmission of drive from the gear 25 to drive axles 3 and 5 that extend from the units A and B respectively. The vehicle drive wheel, not shown, are secured to the ends of shafts 3 and 5. The whole transmission and axle unit is sprung from the vehicle in any suitable manner.

Since the units A and B are identical, only unit A will be described. A three element hydraulic torque converter has an impeller 29, connected to the cross shaft 27, a first rotor 31 and a second rotor 33. The first rotor 31 is secured to a shroud member 35 which in turn is connected to a sleeve shaft 37 having a sun gear 39 thereon. The shroud member encloses the working fluid in the torque converter. A friction band 41 surrounds the shroud 35 and holds the same against rotation when the band 41 is applied. Inside of sleeve shaft 37 is a shaft 43 connected at one end to the second rotor 33 and connected to a pair of one-way devices 45 and 47 at the other end. These one-way devices 45 and 47 are represented in the figure as ratchet devices, and may be of any suitable form such as roller or sprag clutches. The inner race 49 attached to shaft 43 cannot rotate against spade member 50 of the plane of the figure when member 50 is held, but can move into the plane of the figure to drive outer race 51, attached to a flange 53.

The flange 53 is secured to a ring gear 55 meshing with an outer set of planet pinions 57 rotatably mounted on a carrier member 61. As seen in FIGURE 2, a second set of planet pinions 59 are rotatably mounted on the carrier 61 and mesh with the outer pinions 57 and with the sun gear 39. A low brake L connected to a stationary ground member 63 acts to hold carrier 61 against rotation in either direction when applied. A forward brake F also connected to the ground member 63, can be applied to hold the carrier 61 against rotation out of the plane of the paper through the action of a one-way device represented by the ratchet device 65.

Output flange 53 is connected to drive a sun gear 67 of a fixed ratio final gear reduction unit D. A ring gear 69 is permanently held against rotation and pinions 69 mounted on an output carrier 73 mesh with the sun gear 67 and the ring gear 69. The output carrier 73 is connected to the axle shaft 3.

Reference is now made to FIGURES 3 and 4 which show details of the structure for operating the friction bands 41. The left and right torque converter and gear units A and B each have an outer case member 113. These case members are secured to a center case unit 141, with a tie bolt 185 holding the three cases together.

The center case 141 has internal flange members 143 and 153. The bands 41 each have an anchor lug 145 fixed at one end. The anchor lugs 145 are held against rotation by stops 144 and 146 formed as part of the casing 141. The other end of each band 41 which surrounds the shroud 35, has a similar actuating lug 147 fixed thereto. A cross piece 149 having a strengthening flange 151 engages the lugs 147. The cross piece 149 extends through apertures 153 formed in the sides of the center case 141.

Secured in an aperture formed in the side of center case 141 is a reverse servo cylinder 166. A pair of arms 155 extend from cylinder 166. A lever member 161 is pivotally supported on arms 155 by a pin 159. The lower end of lever 161 is bifurcated to enclose the flat end of a piston rod 163 extending through a seal 164 secured in an aperture in the end of the servo cylinder 166. A pin 165 secures the rod 163 and lever 161 for common movement. Slidably mounted inside of the reverse cylinder 166 is a piston 167 which surrounds the rod 163. A spring retainer cap member 169 is held by a nut 173 threaded on the end of piston rod 163. An inner spring 171 between the piston 167 and retainer member 169 urges the rod 163 to the right as seen in FIGURE 4 until a shoulder 170 engages the piston 163.

An outer band release spring 175 is located between the piston 167 and a cover 177 and urges the piston 167 to the left as seen in FIGURE 4. A fluid pressure supply pipe 181 is arranged to feed oil under pressure to the chamber 178 to move piston 167 against spring 175 and through the rod 163 and lever 161 move the lug 147 on bands 41 to the left, as viewed in FIGURE 4. This acts to wrap the bands on the shrouds 35 to hold the same against rotation. When the oil pressure in chamber 178 is released, spring 175 moves piston 167 to the left which moves lever 161 to release the bands 41.

Operation

The transmission gear unit including gears 13, 15, and 19 can be conditioned for either neutral, low or direct drive. This unit can be either automatically or manually controlled and can be utilized to give additional torque multiplication for starting or as a passing gear or both. Forward, reverse, and coast brake low drive conditions are obtained in the combined torque converter and gear units A and B. For forward drive, the brake F is applied and carrier 61 held against reverse rotation by the one-way device 65. The rotor 33 and shaft 43 are likewise held against reverse rotation by the combined action of one-way device 47, carrier 61, one-way device 65, and the forward brake F. Drive of the impeller 29 by the shaft 27 causes oil in the converter to be circulated in a toroidal path to drive the rotor 31 forward in known manner. The rotor 31 carries the sun gear 39 forward, and with the carrier 61 held against reverse rotation, ring gear 55 is driven forward at a reduced rate. The gear unit D further reduces the speed and increases the torque to the drive axles 3 and 5.

During forward drive start, rotor 33 acts as a fluid reaction stator, in known manner, to increase the torque impressed on rotor 31 by the circulating oil. As the speed of the axle shafts 3 and 5 and hence rotor 31 increases the torque multiplication in the torque converter diminishes until the fluid acting on rotor 33 acts against the same to rotate it forward. This forward rotation of rotor 33 is transmitted through the one-way device 45 to the flange 53 and sun gear 67. During this time this one-way device 47 allows forward rotation of shaft 37, and the one-way device 65 allows the carrier 61 to rotate forward.

For reverse drive the forward brake F is released, and the reverse servo is engaged to apply both of the reverse bands 41. This holds the shroud 35 and connected rotor 31 against rotation. The sun gear 39 is likewise held against rotation by shaft 37 connected to the shroud 35. Circulated oil leaving the held rotor 31 will flow in a reverse direction from the direction of rotation of the impeller, and will drive rotor 33 backward. This backward rotation is transmitted to the carrier 61 through the shaft 43 and the one-way device 47. The carrier can rotate backward since the forward brake F is released.

With the sun gear 39 held, and the carrier 61 driven reversely, the ring gear 55 will be driven backwards at a reduced rate. The gear unit D further reduces this rate to the axles.

For coast braking or low operation, the brake L is applied to hold the carrier 61 against rotation in either direction. The gearing will then act to convert wheel drive of the axles while the vehicle is coasting, to an overdrive of the rotor 31. This provides increased engine braking since impeller 29 is mechanically connected to the engine through the gear unit 13—15—19 and a churn action is obtained in the converter.

It will be seen that the invention provides a compact automatic transmission unit that individually drives each axle, allows the axles to rotate at different speeds and yet always drives each wheel regardless of whether the other wheel is slipping. The axle unit can be utilized with conventional rear suspension. By utilizing a single servo to operate friction elements in each axle unit considerable space and weight is saved, and an equalized force application of the friction elements is assured.

Changes and modifications of the representative embodiment shown may be made by those skilled in the art, without departing from the scope and spirit of the invention which is to be limited only by the following claims.

We claim:

1. In a transmission, a combination hydraulic torque converter and gearing unit having an input shaft and an output shaft, said torque converter including a vaned impeller connected to be driven by said input shaft in a forward direction and adapted to circulate working fluid in a closed fluid toroidal path, a first vaned runner and a second vaned runner arranged in said fluid path, said gearing including a planetary gear set having a sun gear, a ring gear and a planet carrier having a first set of planet pinions meshing with said sun gear and a second set of planet pinions meshing with said ring gear and with said first set of planet pinions, means connecting said first runner to said sun gear, means for transmitting forward rotation of said second runner to said ring gear, means for transmitting reverse rotation of said second runner to said carrier, releasable means for preventing reverse rotation of said carrier, and means connecting said ring gear to said output shaft.

2. In a transmission, a combination hydraulic torque converter and gearing unit having an input shaft and an output shaft, said torque converter including a vaned impeller connected to be driven by said input shaft in a forward direction and adapted to circulate working fluid in a closed fluid toroidal path, a first vaned runner and a second vaned runner arranged in said fluid path, said gearing including a planetary gear set having a sun gear, a ring gear and a planet carrier having a first set of planet pinions meshing with said sun gear and a second set of planet pinions meshing with said ring gear and with said first set of planet pinions, means connecting said first runner to said sun gear, first overrunning means for transmitting forward rotation of said second runner to said ring gear, second overrunning means for transmitting reverse rotation of said second runner to said carrier, releasable means including overrunning means for preventing reverse rotation of said carrier, and means connecting said ring gear to said output shaft.

3. In a transmission, a combination hydraulic torque converter and gearing unit having an input shaft and an output shaft, said torque converter including a vaned impeller connected to be driven by said input shaft in a forward direction and adapted to circulate working fluid in a closed fluid toroidal path, said gearing including a first vaned runner and a second vaned runner arranged in said fluid path, a planetary gear set having a sun gear, a ring gear and a planet carrier having a first set of planet pinions meshing with said sun gear and a second set of planet pinions meshing with said ring gear and with said first set of planet pinions, means connecting said first runner to said sun gear, first overrunning means for transmitting forward rotation of said second runner to said ring gear, second overrunning means for transmitting reverse rotation of said second runner to said carrier, releasable means for preventing reverse rotation of said carrier, means connecting said ring gear to said output shaft, and releasable means for holding said first runner and said sun gear against rotation.

4. In a transmission, a combination hydraulic torque converter and gearing unit having an input shaft and an output shaft, said torque converter including a vaned impeller connected to be driven by said input shaft in a forward direction and adapted to circulate working fluid in a closed fluid toroidal path, said gearing including a first vaned runner and a second vaned runner arranged in said fluid path, a planetary gear set having a sun gear, a ring gear and a planet carrier having a first set of planet pinions meshing with said sun gear and a second set of planet pinions meshing with said ring gear and with said first set of planet pinions, means connecting said first runner to said sun gear, first overrunning means for transmitting forward rotation of said second runner to said ring gear, second overrunning means for transmitting reverse rotation of said second runner to said carrier, releasable means including a one way device for preventing reverse rotation of said carrier, releasable means for preventing both forward and reverse rotation of said carrier, and means connecting said ring gear to said output shaft.

References Cited in the file of this patent

UNITED STATES PATENTS

| | | |
|---|---|---|
| 1,805,808 | Crum | May 19, 1931 |
| 1,932,685 | Black | Oct. 31, 1933 |
| 2,376,699 | Jandasek | May 22, 1945 |
| 2,456,328 | Schneider | Dec. 14, 1948 |
| 2,627,946 | Misch | Feb. 10, 1953 |
| 2,716,906 | Seybold | Sept. 6, 1955 |
| 2,803,974 | Kelley | Aug. 27, 1957 |
| 2,858,675 | Schneider | Nov. 4, 1958 |
| 2,871,661 | Burnett | Feb. 3, 1959 |
| 2,874,808 | Scott | Feb. 24, 1959 |
| 2,883,881 | Baker | Apr. 28, 1959 |